US005604880A

United States Patent [19]
Dipert

[11] Patent Number: 5,604,880
[45] Date of Patent: Feb. 18, 1997

[54] COMPUTER SYSTEM WITH A MEMORY IDENTIFICATION SCHEME

[75] Inventor: Brian L. Dipert, Sacramento, Calif.

[73] Assignee: Intel Corporation, Santa Clara, Calif.

[21] Appl. No.: 643,990

[22] Filed: May 7, 1996

Related U.S. Application Data

[63] Continuation of Ser. No. 289,054, Aug. 11, 1994, abandoned.

[51] Int. Cl.⁶ ............................. G06F 12/00; G06F 12/14
[52] U.S. Cl. ............................................ 395/430; 395/440
[58] Field of Search ................................. 395/481, 490, 395/497.01

[56] References Cited

U.S. PATENT DOCUMENTS

| | | | |
|---|---|---|---|
| 5,175,719 | 12/1992 | Iimura | 369/58 |
| 5,197,034 | 3/1993 | Fandrich et al. | 365/227 |
| 5,267,213 | 11/1993 | Sung et al. | 365/226 |
| 5,307,320 | 4/1994 | Farrer | 365/230.01 |
| 5,457,659 | 10/1995 | Schaefer | 365/222 |
| 5,541,904 | 7/1996 | Fite | 369/58 |
| 5,541,905 | 7/1996 | Aramaki | 369/58 |

OTHER PUBLICATIONS

*1991 Memory Products Handbook*, Intel Corporation, pp. 6–55 through 6–80 (1991).

*Primary Examiner*—Tod R. Swann
*Assistant Examiner*—Christopher S. Chow
*Attorney, Agent, or Firm*—Blakely, Sokoloff, Taylor & Zafman

[57] ABSTRACT

In a computer system having a central processing unit (CPU) coupled to a memory, a method is described for identifying whether the memory is a first type of memory or a second type of memory. A programming voltage is decoupled from a control circuit of the memory such that the control circuit is disabled from accessing a memory array of the memory during a write operation of the memory. The memory is then accessed from the CPU through the write operation for a device identification from the memory. The first type of memory includes the device identification and the second type of memory does not include the device identification. Data integrity of the memory is maintained during the write operation because the memory array of the memory is not accessed during the operation. The memory is then identified as the first type of memory if the CPU receives the device identification from the memory. The memory is identified as the second type of memory if the CPU does not receive the device identification from the memory.

14 Claims, 7 Drawing Sheets

COMPUTER SYSTEM WITH A MEMORY IDENTIFICATION SCHEME

This is a continuation application Ser. No. 08/289,054, filed Aug. 11, 1994, now abandoned.

FIELD OF THE INVENTION

The present invention pertains to the field of computer memories. More particularly, this invention relates to a computer system with a memory identification scheme that allows the computer system to automatically identify the type of memory within the system and to configure the system accordingly.

BACKGROUND OF THE INVENTION

One type of prior art nonvolatile memory is an Erasable Programmable Read-Only Memory ("EPROM"). The EPROM is organized into rows and columns. Memory cells are placed at intersections of word lines and bit lines. Each word line is connected to the gates of a plurality of memory cells in one row. Each bit line is connected to the drains of a plurality of memory cells in one column. The sources of all the memory cells are connected to a common source line. The EPROM can be programmed by a user. Once programmed, the EPROM retains its data until erased. Erasure of the EPROM using ultraviolet light erases the entire contents of the memory. The memory may then be reprogrammed with new data.

The EPROM is typically programmed with programs before being configured into a computer system. Once programmed, the EPROM typically does not allow any reprogramming by a central processing unit ("CPU") of a computer system when the EPROM is installed in the computer system. This is due to the fact that the EPROM is not electrically erasable.

Another type of prior art nonvolatile memory is a flash Erasable and electrically Programmable Read-Only Memory ("flash EPROM"). A typical flash EPROM has the same array configuration as a standard EPROM and can be programmed in similar fashion as EPROM. Once programmed, the entire contents of the flash EPROM can be erased by electrical erasure in one relatively rapid operation. A high erasing voltage is made available to the sources of all the cells in the flash EPROM simultaneously. This results in a full array erasure. The flash EPROM may then be reprogrammed with new data.

Given that flash EPROM is electrically erasable and programmable, the CPU of a computer system can reprogram the flash EPROM without removing the flash EPROM from the computer system. This reprogramming is referred to as in-system writing ("ISW"). With ISW, the CPU controls the reprogramming of the flash EPROM and the programming erasure voltage Vpp is generated locally within the system.

A computer system can include either the EPROM or flash EPROM. For example, the computer system may initially use flash EPROM. Once the manufacturer determines that no future code updates will be required, the computer system production may then switch to using EPROM. The EPROM and the flash EPROM can use the same memory socket in the computer system. This is because they have substantially similar pin configuration and definition. Because the flash EPROM is both electrically programmable and electrically erasable, the computer system can electrically program and electrically erase the flash EPROM in the memory socket, and can contain flash EPROM update software or load this software from a disk driver. When an EPROM is placed in the memory socket, the computer system simply disables the electrical update function to the memory socket by not applying the Vpp voltage to the socket, and by not writing programming and erasure commands to the socket. In contrast, when the computer system uses an ultraviolet light erasable EPROM, an ISW update of the programs in the EPROM is not possible.

One disadvantage of such a system configuration is that the CPU does not know whether an EPROM or a flash EPROM is placed in the memory socket. Thus, the computer system is unable to reconfigure itself in accordance with the type of the memory placed in the memory socket. In addition, data may be corrupted when the CPU of the system attempts to reprogram an EPROM in the socket.

SUMMARY AND OBJECTS OF THE INVENTION

One of the objects of the present invention is to provide a computer system that can be automatically configured with different types of memories.

Another object of the present invention is to allow a computer system to automatically detect the type of memory in the system and reconfigure the system interface with the memory in accordance with the type of memory detected.

Another object of the present invention is to provide a computer system with a memory identification scheme such that the computer system can reconfigure itself in accordance with the type of memory detected.

In a computer system having a central processing unit (CPU) coupled to a memory, a method is described for identifying whether the memory is a first type of memory or a second type of memory. A programming voltage is decoupled from a control circuit of the memory such that the control circuit is disabled from accessing a memory array of the memory during a write operation of the memory. The memory is then accessed from the CPU through the write operation for a device identification from the memory. The first type of memory includes the device identification and the second type of memory does not include the device identification. Data integrity of the memory is maintained during the write operation because the memory array of the memory is not accessed during the operation. The memory is then identified as the first type of memory if the CPU receives the device identification from the memory. The memory is identified as the second type of memory if the CPU does not receive the device identification from the memory.

A computer system includes a central processing unit (CPU), a memory coupled to the CPU, and a logic for identifying whether the memory is the first type of memory or the second type of memory. The memory further includes a memory array and a control circuit for controlling memory operations of the memory array. The control circuit stores a device identification of the memory if the memory is a first type of memory. The control circuit does not store the device identification of the memory if the memory is a second type of memory. The logic further includes a first logic for decoupling a programming voltage from the control circuit of the memory such that the control circuit is disabled from accessing the memory array during a write operation of the memory. The logic also includes a second logic for causing the CPU to access the memory by writing a command to the control circuit through the write operation for the device identification from the memory. Data integrity of the memory is maintained during the write operation because the memory array of the memory is not accessed during the write operation. A third logic is provided for identifying the memory as the first type of memory if the device identification is received from the memory. A fourth logic is provided for identifying the memory as the second type of memory if the device identification is not received from the memory. A fifth logic is provided for coupling the programming voltage to the control circuit of the memory when the memory is identified as the first type of memory. A sixth logic is provided for maintaining the programming voltage disconnected from the control circuit of the memory when the memory is identified as the second type of memory.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
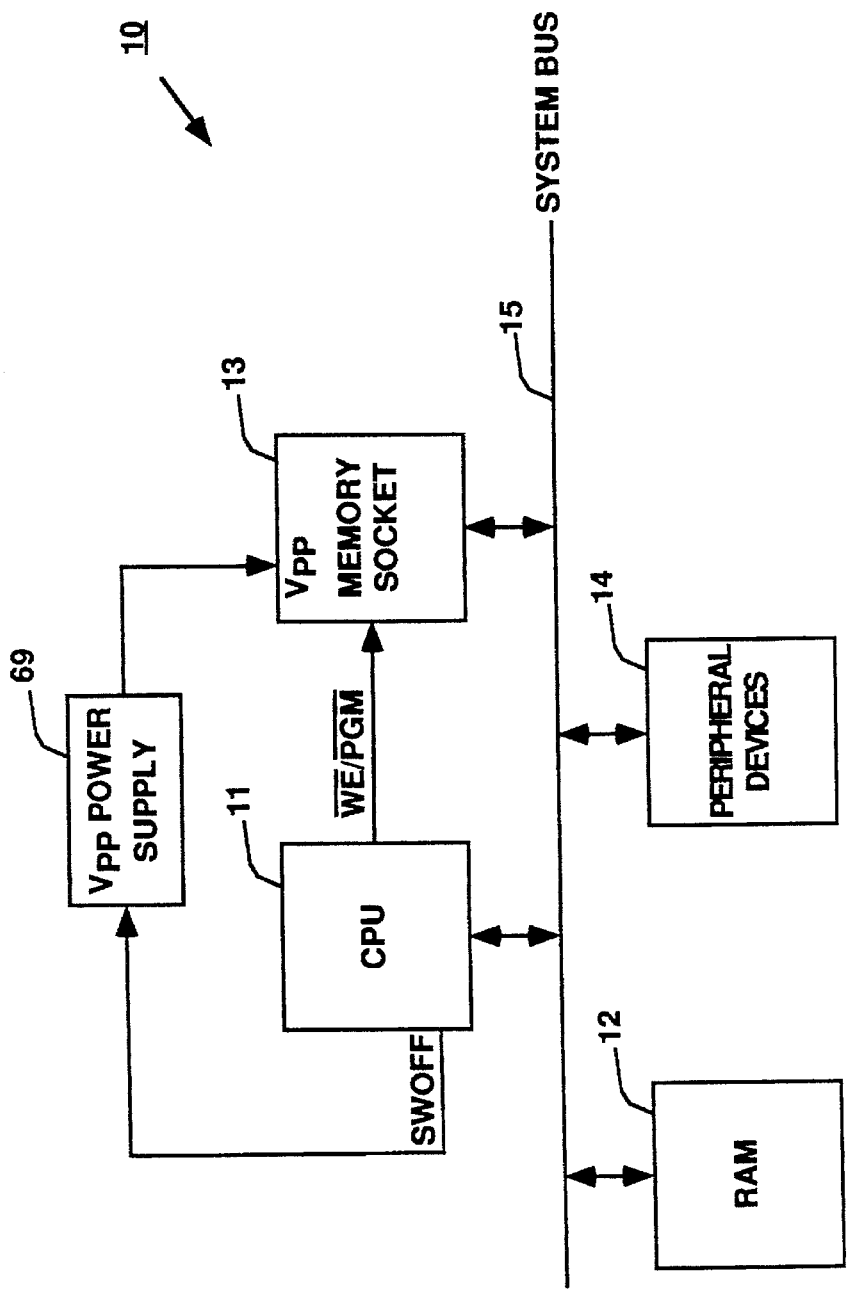
FIG. 1 is a block diagram of a computer system that includes a memory socket for connecting a memory in the system and a memory identification and system configuration scheme for identifying the type of memory in the socket and for configuring the system accordingly in accordance with an embodiment of the present invention.

FIG. 1 is a block diagram of a computer system 10 which includes a memory socket 13 for connecting a memory to the system and which implements a memory identification and system configuration scheme in accordance with an embodiment of the present invention.

Computer system 10, for one embodiment, is a personal computer system. For another embodiment, computer system 10 can be a laptop computer or a notebook computer. Alternatively, computer system 10 can be a workstation, a minicomputer, a mainframe computer, a multiprocessor computer, or any other type of computer. In addition, computer system 10 may be any other type of data processing or signal processing system. For example, computer system 10 may be a printer system or a cellular phone system.

Computer system 10 includes a CPU 11 coupled to bus 15. CPU 11 may include a microprocessor. Bus 15 is also connected to a random access memory ("RAM") 12 and peripheral devices 14. RAM 12 is the system memory of computer system 10 and peripheral devices 14 may include a keyboard, a display, a modem, a printer, a disk drive, and other devices.

Figure 2:
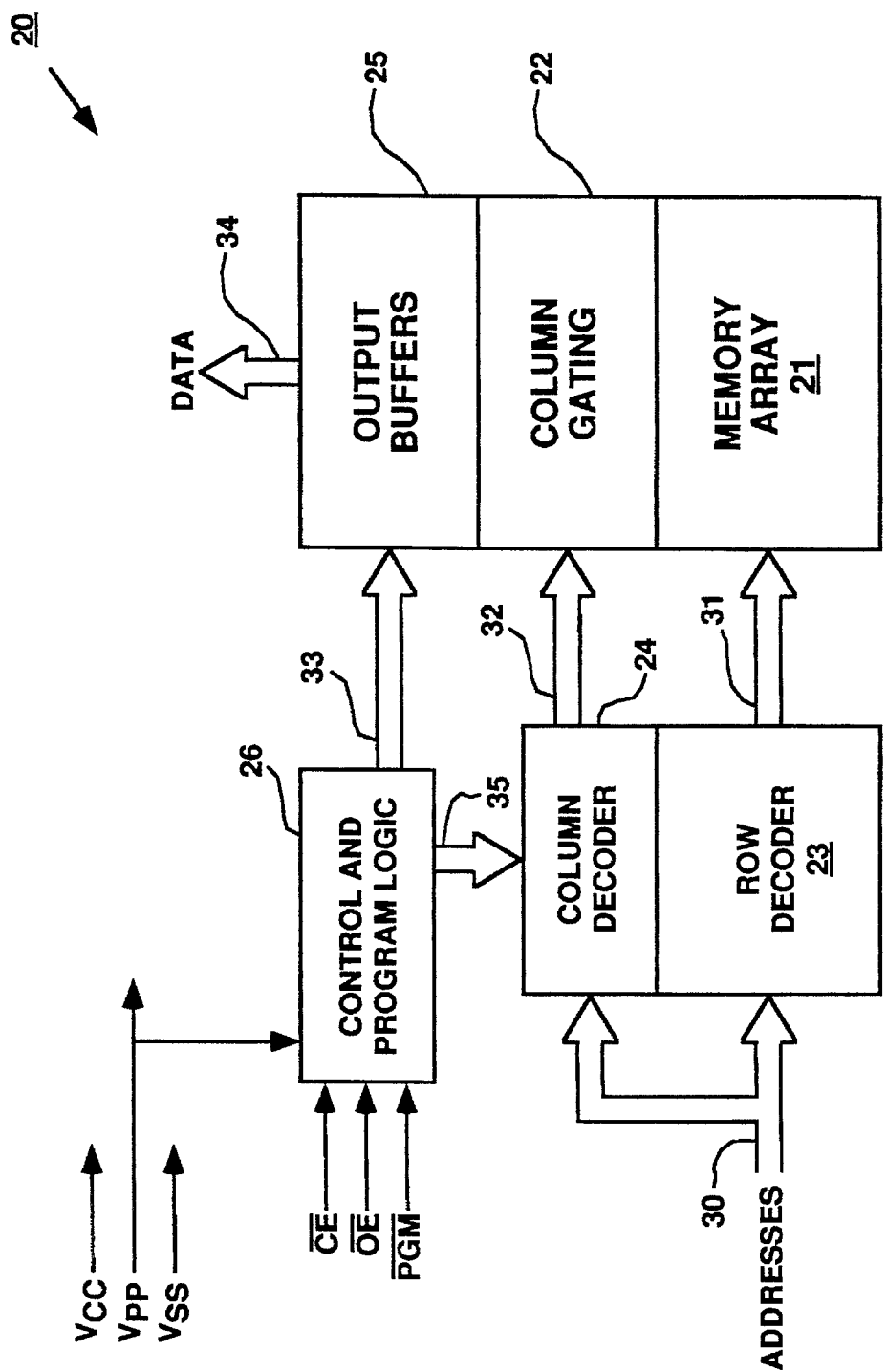
FIG. 2 is a block diagram of a prior art EPROM that can be placed in the memory socket of FIG. 1.
Figure 3:
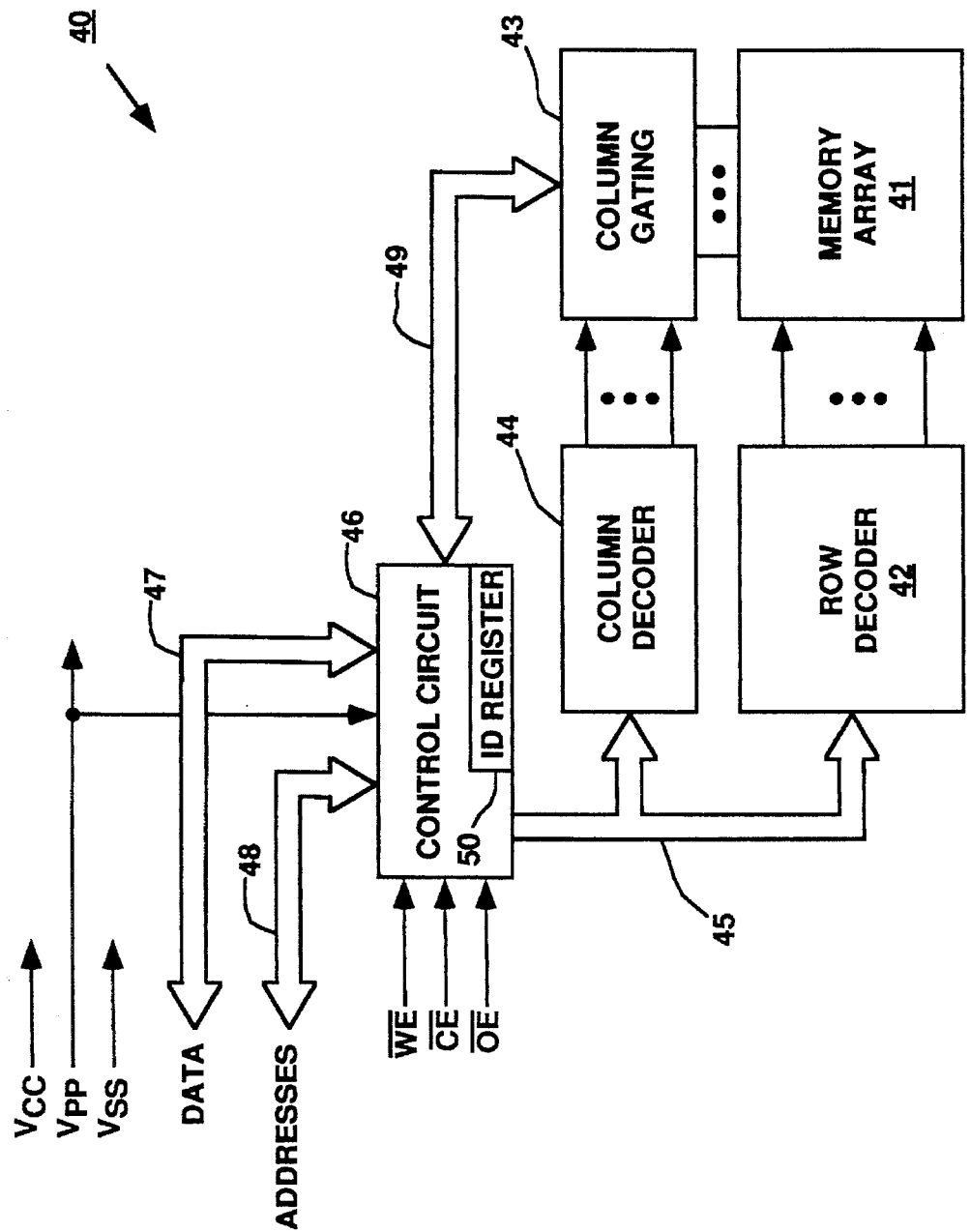
FIG. 3 is a block diagram of a prior art flash EPROM that can also be placed in the memory socket of FIG. 1.
Figure 4:
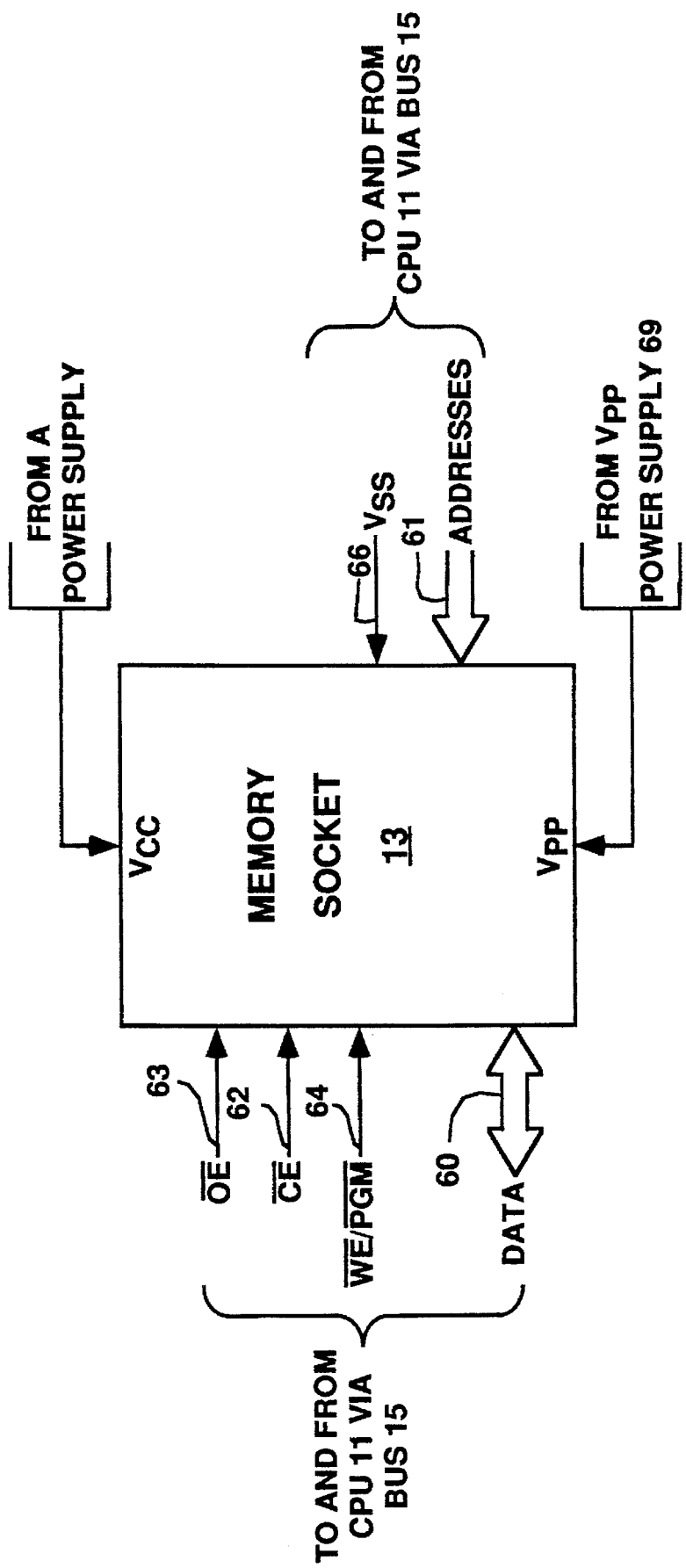
FIG. 4 shows the signal connections of the memory socket of FIG. 1.

In addition, bus 15 is also connected to memory socket 13. Memory socket 13 is employed to connect a nonvolatile-type of memory into computer system 10. For example, a ROM can be placed in socket 13. An EPROM can also be placed in socket 13. In addition, socket 13 may contain a flash EPROM. FIG. 2 shows a prior art EPROM that can be placed in socket 13, which will be described in more detail below. FIG. 3 shows a prior art flash EPROM 40 that can be placed in socket 13, which will be described in more detail below. FIG. 4 shows the signal connections of socket 13 when either EPROM 20 of FIG. 2 or flash EPROM 40 of FIG. 3 is placed in socket 13, which will also be described in more detail below.

As will be described in more detail below, the programming and erasure voltage Vpp is disconnected from memory socket 13. CPU 11 then writes a read device ID command to socket 13. CPU 11 writes the command to socket 13 by asserting the $\overline{\text{WE/PGM}}$ signal to memory socket 13. CPU 11 then accesses socket 13 again in attempt to read the device ID from socket 13. A flash EPROM includes a device ID while an EPROM does not have a device ID. If a flash EPROM is installed in socket 13, CPU 11 receives the device ID. If an EPROM is placed in socket 13, CPU 11 does not receive the device ID. When CPU 11 does not receive the device ID from socket 13, CPU 11 ensures that the Vpp voltage is disconnected from socket 13 and the programming and erasure commands are not applied to socket 13.

Referring to FIG. 2, EPROM 20 includes a memory array 21 and address decoders 23 and 24 coupled to array 21. EPROM 20 also includes a control and program logic 26 for controlling the memory operations of memory array 21.

The Vpp pin receives the program power supply voltage Vpp for EPROM 20. The Vcc pin receives the chip power supply for EPROM 20 and Vss is ground.

EPROM 20 also includes a chip enable pin $\overline{\text{CE}}$, an output enable pin $\overline{\text{OE}}$, and a program pin $\overline{\text{PGM}}$. Chip enable pin $\overline{\text{CE}}$ is a power control and is used for device selection. Output enable pin $\overline{\text{OE}}$ is an output control pin and is used to gate data from output pins 34 of EPROM 20 independent of device selection. Chip enable pin $\overline{\text{CE}}$, output enable pin $\overline{\text{OE}}$, and program pin $\overline{\text{PGM}}$ are connected to control and program logic 26. The $\overline{\text{PGM}}$ signal controls the data applied at output pins 34 to be programmed into array 21 when EPROM 20 is in the programming mode.

EPROM 20 has a plurality of operating modes. A read mode is initiated by the user when both chip enable input pin $\overline{\text{CE}}$ and output enable input pin $\overline{\text{OE}}$ are set to a logical low state. When EPROM 20 is in the read mode, data stored in memory array 21 can be read. A programming mode is initiated when the Vpp voltage is applied to the Vpp pin of EPROM 20. When EPROM 20 is in the programming mode, data can be stored in memory array 21 by pulsing the $\overline{\text{PGM}}$ pin low.

In absence of the Vpp high voltage applied to the Vpp pin of EPROM 20, EPROM 20 acts as a read-only memory and control and program logic 26 is disabled from accessing memory array 21 for the programming operation even when the $\overline{\text{PGM}}$ signal is active low. Logic 26 only responds to the $\overline{\text{CE}}$ and $\overline{\text{OE}}$ signals and does not react to the $\overline{\text{PGM}}$ signal.

Control and program logic 26 stores the device ID ("identification") for EPROM 20 that can only be read when EPROM 20 is placed in a particular mode. The particular mode is entered when the Vpp voltage is applied to one of the address pins of EPROM 20. Alternatively, control and program logic 26 does not store the device ID for EPROM 20.

FIG. 3 is a block diagram of flash EPROM 40. Flash EPROM 40 includes a memory array 41 and decoders 42 and 44 coupled to memory array 41.

Flash EPROM 40 also includes control circuitry 46. Control circuitry 46 controls the memory operations of flash EPROM 40. The memory operations include read, programming, and erasure operations. Control circuitry 46 receives addresses from external circuitry (not shown) via address pins 48. Control circuitry 46 also receives the data to be written to memory array 41 from the external circuitry and sends the data read from memory array 41 to the external circuitry via data pins 47. Data pins 47 also supply the device operation commands to control circuitry 46.

Control circuitry 46 receives four control signals via their respective pins. These control signals are a chip enable control signal $\overline{CE}$, an output enable control signal $\overline{OE}$, and a write enable control signal $\overline{WE}$. The chip enable $\overline{CE}$ signal is the power control signal for flash EPROM 40. The output enable $\overline{OE}$ signal is the output control for flash EPROM 40. The write enable control signal $\overline{WE}$ allows writes to control circuitry 46 while the chip enable control signal $\overline{CE}$ is active low.

The Vpp pin receives the program/erase power supply voltage Vpp for flash EPROM 40. The Vet pin receives the device power supply voltage for flash EPROM 40 and VSS is ground.

Control circuitry 46 further includes a device ID register 50 for storing a device ID for flash EPROM 40. The device ID indicates what type of memory flash EPROM 40 is. Alternatively, the device ID is also used to select flash EPROM 40 among a number of flash EPROMs in the system as part of a memory addressing scheme. The device ID can be written into register 50 by a device ID write command applied to control circuitry 46 via data pins 47. The device ID can also be read by a device ID read command written to control circuitry 46 via data pins 47. Upon receiving the command, control circuitry 46 accesses register 50 for the device ID and sends the device ID to the external circuitry via data pins 47.

When the Vpp voltage is applied to the Vpp pin of flash EPROM 40, control circuitry 46 is enabled to access memory array 41 for a read, programming, or erasure operation upon receiving an appropriate command via data pins 47. The commands are written into control circuitry 46 by the logical low $\overline{WE}$ signal. When the Vpp pin of flash EPROM 40 is not applied with the Vpp voltage, control circuitry 46 is disabled from programming or erasing memory array 41 and flash EPROM 40 acts as a read-only memory. Meanwhile, control circuitry 46 can still be written with various commands by the logical low $\overline{WE}$ signal. One such command is the device ID read command, as described above. The device ID read command then causes control circuitry 46 to read the device ID in register 50 and send the device ID to the external circuitry via data pins 47.

Figure 5:
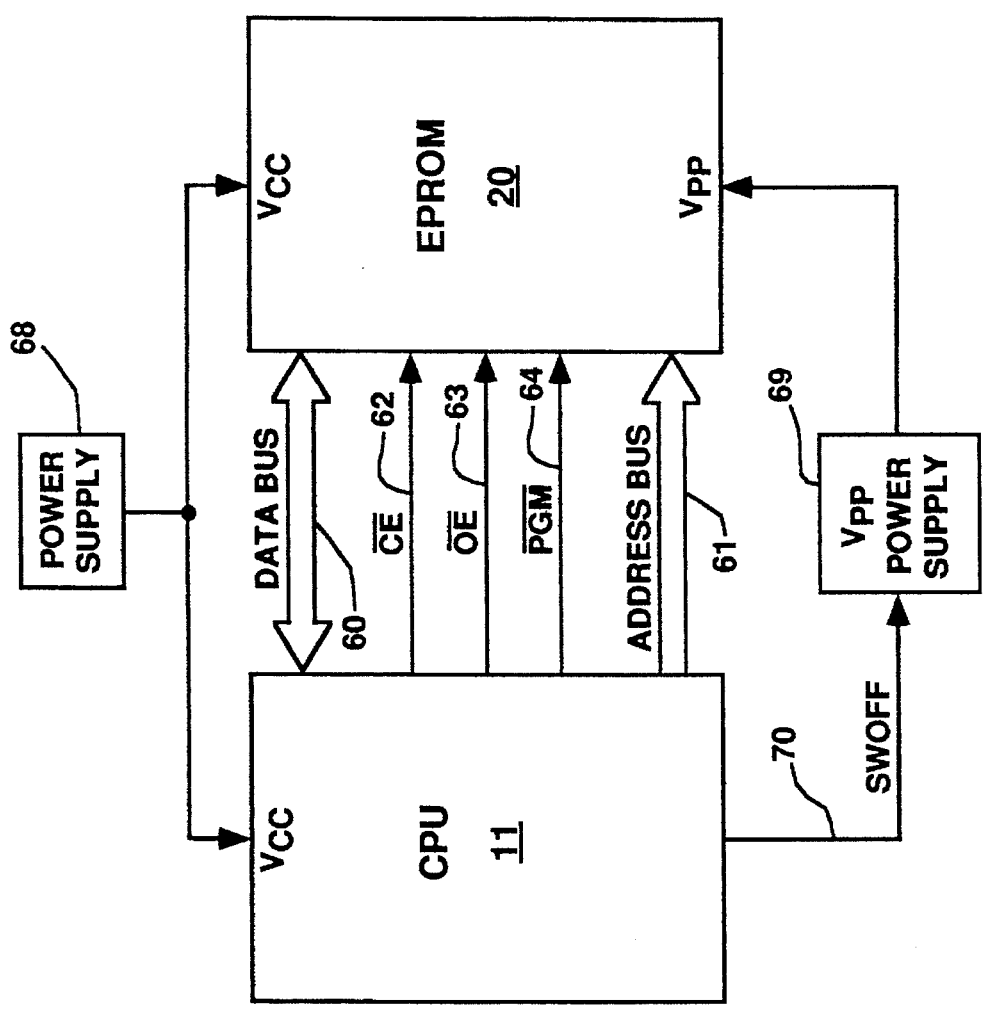
FIG. 5 is a block diagram of the EPROM of FIG. 2 connected to the CPU via the socket of FIGS. 1 and 4.
Figure 6:
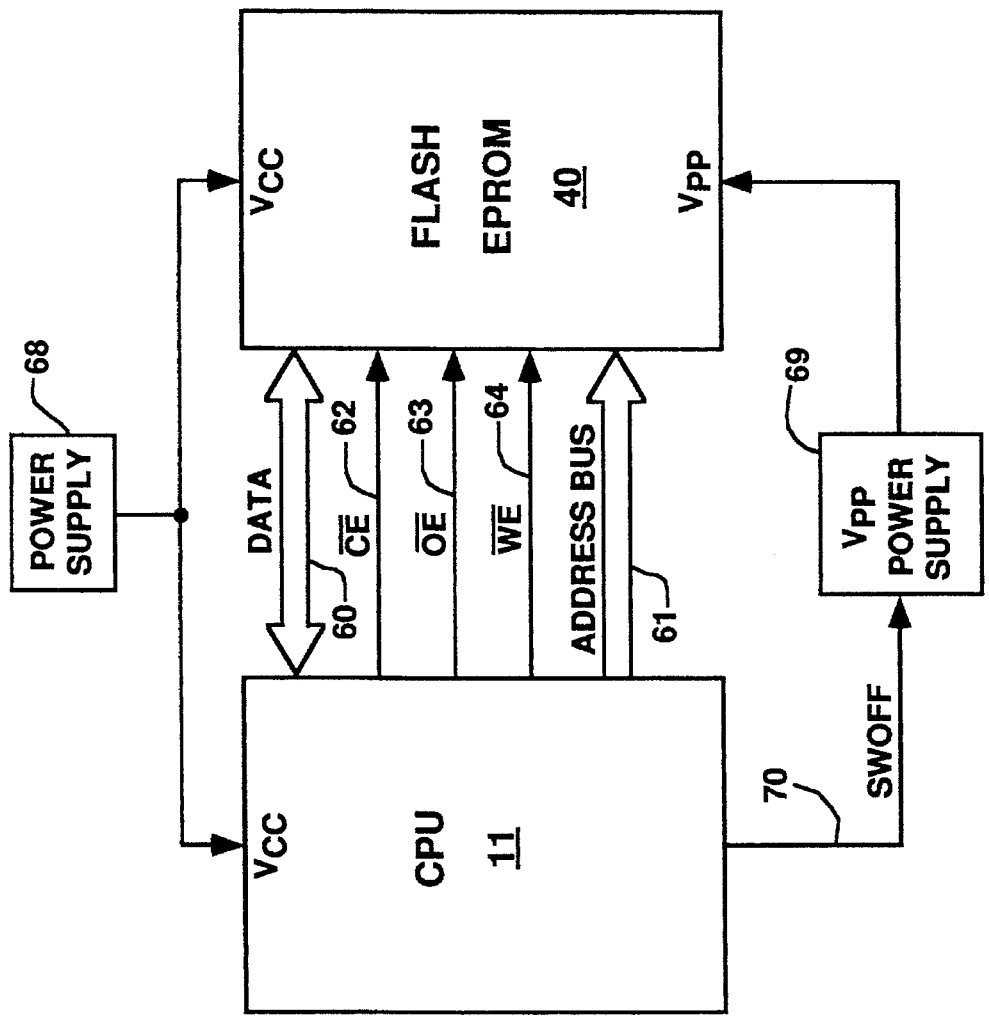
FIG. 6 is a block diagram of the flash EPROM of FIG. 3 connected to the CPU via the socket of FIGS. 1 and 4.

Referring to FIG. 4, the signal connections of socket 13 to CPU 11 of computer system 10 of FIG. 1 is shown in more detail. As can be seen from FIG. 4, line 64 applies either the $\overline{WE}$ signal or the $\overline{PGM}$ signal to socket 13. When socket 13 receives flash EPROM 40 of FIG. 3, line 64 applies the $\overline{WE}$ signal to socket 13. When EPROM 20 of FIG. 2 is placed in socket 13, line 64 applies the $\overline{PGM}$ signal to socket 13. FIG. 5 shows the connection of EPROM 20 of FIG. 2 with CPU 11 of FIG. 1 via socket 13 of FIGS. 1 and 4, which will be described in more detail below. FIG. 6 shows the connection of flash EPROM 40 of FIG. 3 with CPU 11 of FIG. 1 via socket 13 of FIGS. 1 and 4, which will also be described in more detail below.

Referring to FIG. 5, when CPU 11 needs to access EPROM 20 for a read operation, CPU 11 asserts the $\overline{CE}$ and $\overline{OE}$ signals to EPROM 20. The $\overline{PGM}$ signal is deasserted and CPU 11 generates a switch off signal SWOFF to a Vpp power supply 69 (also shown in FIG. 1) via line 70. The SWOFF signal causes Vpp power supply 69 to disconnect the Vpp voltage from the Vpp pin of EPROM 20. Addresses are then applied to EPROM 20 from CPU 11 via bus 61 and data are then read from EPROM 20 to CPU 11 via bus 60.

When the Vpp voltage is applied to the Vpp pin of EPROM 20, EPROM 20 enters the programming mode and CPU 11 can program EPROM 20. When this occurs, any data applied to EPROM 20 via data bus 60 will be programmed into EPROM 20 at the low $\overline{PGM}$ signal, even if the data is not supposed to be programmed into the device. The unwanted programming, however, damages data integrity of EPROM 20. Therefore, it is desirable that the Vpp high voltage should be disconnected from EPROM 20 when EPROM 20 is not to be programmed.

Referring to FIG. 6, because flash EPROM 40 is electrically erasable and programmable, CPU 11 can perform read, programming, and erasure operations on flash EPROM 40. In addition, CPU 11 can access information stored in control circuit 46 (FIG. 3) of flash EPROM 40 when the Vpp pin of flash EPROM 40 does not receive the Vpp high voltage.

When the Vpp voltage is not applied to flash EPROM 40, CPU 11 can obtain the device ID stored in register 50 (FIG. 3) of flash EPROM 40 by writing the device ID read command to control circuit 46. CPU 11 does this by asserting the $\overline{WE}$ signal and applying the command to flash EPROM 40 via bus 60. The command is then written into control circuit 46 by the active $\overline{WE}$ signal. Because the Vpp voltage is not applied to flash EPROM 40, control circuit 46 is disabled from accessing memory array 41 (FIG. 3) for programming and erasure operations and only accesses register 50 for the device ID. Control circuit 46 then sends the device ID to CPU 11 via bus 60.

Figure 7:
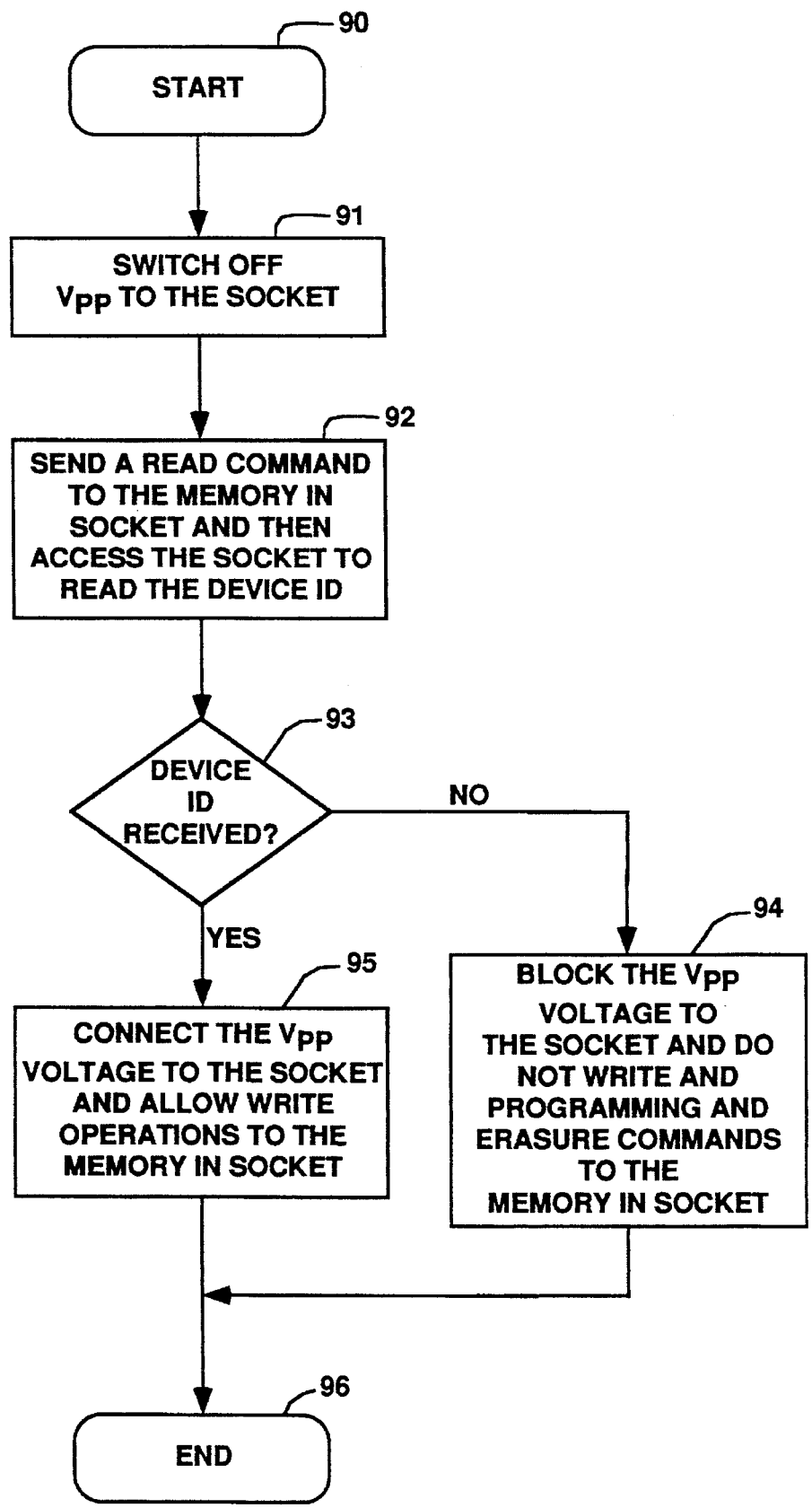
FIG. 7 is a flow chart diagram of the memory identification and system configuration scheme in accordance with an embodiment of the present invention.

Referring back to FIG. 1, because socket 13 can accommodate different types of memories, it is therefore desirable for computer system 10 to detect the type of memory placed in socket 13 and to configure the system in accordance with the type of memory detected. FIG. 7 shows the flow chart diagram of the memory identification and system configuration scheme in accordance with one embodiment of the present invention, which will be described in more detail below.

The memory identification and system configuration scheme of FIG. 7 is implemented in computer system 10 of FIG. 1. The scheme detects whether an EPROM, such as EPROM 20 of FIG. 2, is placed in socket 13 or a flash EPROM, such as flash EPROM 40 of FIG. 3, is placed in socket 13. The scheme then configures the system accordingly. Alternatively, the scheme can detect other types of memories in socket 13 or be modified to detect other types of memories in socket 13. For example, the scheme of FIG. 7 can detect whether a ROM or a flash EPROM is placed in socket 13.

This scheme takes advantage of the ability of reading the device ID from the control circuit of a flash EPROM by writing the device ID read command to the flash EPROM in absence of the high Vpp voltage applied to the flash EPROM. Because an EPROM can not be written with anything when the Vpp voltage is not applied to the device, no device ID will be received from socket 13 (FIG. 1) when an EPROM is placed in socket 13. This allows the scheme to detect whether a flash EPROM or an EPROM is placed in socket 13. If, however, the Vpp voltage is applied to socket 13 and an EPROM exists in the socket, unwanted programming will occur if CPU 11 attempts to write the device ID read command to socket 13. This damages the data integrity of the EPROM placed in socket 13. Therefore, the scheme in accordance with one embodiment of the present invention first removes the Vpp voltage from socket 13 and then causes CPU 11 to write the device ID command to socket 13. This ensures the data integrity of the memory in socket 13 if the memory is an EPROM.

It is, however, possible that valid data stored in an EPROM could match the device ID for flash EPROM. This may cause a false detection that a flash EPROM is placed in socket 13 when the EPROM is in fact placed in socket 13. In order to avoid such possibility, the address locations (i.e., 00H and 01H) of an EPROM are not used to store any data and are reset to a predetermined value that does not match any possible device ID for a flash EPROM. These 00H and 01H address locations of an EPROM correspond to the address locations of a flash EPROM where the device ID is stored.

Referring now to FIGS. 1 and 7, the scheme starts at step 90, at step 91, CPU 11 (FIG. 1) generates the SWOFF signal to disconnect the Vpp voltage from socket 13 (FIGS. 1 and 4). This prevents the memory (not shown) in socket 13 from being in the programming mode. At step 92, CPU 11 sends the device ID read command to the memory placed in socket 13 in attempt to read the device ID from the memory. CPU 11 does this by pulsing the $\overline{\text{WE/PGM}}$ signal active low. The active low $\overline{\text{WE/PGM}}$ signal may cause the command to be written into the control circuit of the memory in socket 13. As described above, if flash EPROM 40 is placed in socket, the command is written into control circuit 46 (FIG. 3) under control of the low $\overline{\text{WE}}$ signal. If EPROM 20 is placed in socket 13, the command is not written into control and program logic 26.

At step 93, a judgment is made to determine if the device ID is received from the memory in socket 13. As described above, flash EPROM 40 of FIG. 3 includes register 50 in control circuit 46 to store its device ID. EPROM 20 of FIG. 2, however, does not store its device ID in control and program logic 26 that can be accessed by CPU 11 when EPROM 20 does not receive the Vpp voltage. If flash EPROM 40 of FIG. 3 is placed in socket 13, CPU 11 receives the device ID from socket 13 upon sending the command to socket 13. If, however, EPROM 20 of FIG. 2 is placed in socket 13, CPU 11 does not receive the device ID from socket 13.

If CPU 11 receives the device ID at step 93, then the memory in socket 13 is determined to be a flash EPROM and step 95 is the next step. At step 95, CPU 11 then deasserts the SWOFF signal to Vpp power supply 69 such that Vpp power supply 69 can provide the Vpp voltage to socket 13. This allows CPU 11 to perform the memory write operation to the memory in socket 13. The process then ends at step 96.

If, at step 93, it is determined that the device ID is not received by CPU 11, then the memory in socket 13 is determined to be an EPROM and step 94 is the next step. At step 94, CPU 11 maintains the SWOFF signal to Vpp power supply 69 such that Vpp power supply 69 is disabled from applying the Vpp voltage to socket 13. This prevents CPU 11 from performing any write operation to the memory in socket 13. In addition, CPU 11 is disabled from generating programming and erasure commands to the memory in socket 13. The process then ends at step 96.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a computer system having a central processing unit (CPU) coupled to a memory, a method of identifying whether the memory is a first type of memory or a second type of memory, comprising the steps of:

(A) decoupling a programming voltage from a control circuit of the memory such that the control circuit is disabled from accessing a memory array of the memory during a write operation of the memory while still allowing the control circuit to be accessible from the CPU through the write operation;

(B) accessing the control circuit of the memory from the CPU without accessing the memory array through the write operation for a device identification from the memory such that data integrity of the memory is maintained during the write operation, wherein the first type of memory includes the device identification stored in the control circuit and the second type of memory does not include the device identification;

(C) identifying the memory as the first type of memory if the CPU receives the device identification from the memory and as the second type of memory if the CPU does not receive the device identification from the memory.

2. The method of claim 1, further comprising the step of coupling the programming voltage to the control circuit of the memory when the memory is identified as the first type of memory.

3. The method of claim 1, further comprising the step of maintaining the programming voltage disconnected from the control circuit of the memory when the memory is identified as the second type of memory.

4. The method of claim 1, wherein the step (B) further comprises the step of writing a read command from the CPU to the control circuit of the memory to read the device identification.

5. The method of claim 1, wherein the first type of memory is a flash erasable and electrically programmable nonvolatile memory and the second type of memory is an electrically programmable nonvolatile memory.

6. The method of claim 1, wherein the first type of memory is a flash erasable and electrically programmable nonvolatile memory and the second type of memory is a read-only memory.

7. A computer system, comprising:

(A) a central processing unit (CPU);

(B) a memory coupled to the CPU, wherein the memory further comprises (i) a memory array;

(ii) a control circuit that controls memory operations of the memory array, wherein the control circuit stores a device identification of the memory if the memory is a first type of memory, wherein the control circuit does not store the device identification of the memory if the memory is a second type of memory;

(C) an identifying logic that identifies whether the memory is the first type of memory or the second type of memory, wherein the logic further comprises (a) a first logic that decouples a programming voltage from the control circuit of the memory such that the control circuit is disabled from accessing the memory array during a write operation of the memory while the control circuit is still accessible by the CPU through the write operation;

(b) a second logic that causes the CPU to access the memory by writing a command to the control circuit through the write operation for the device identification from the memory without accessing the memory array, wherein data integrity of the memory is maintained during the write operation because the memory array of the memory is not accessed during the write operation;

(c) a third logic that identifies the memory as the first type of memory if the device identification is received from the memory; and (d) a fourth logic that identifies the memory as the second type of memory if the device identification is not received from the memory.

8. The computer system of claim 7, wherein the identifying logic further comprises a fifth logic that couples the programming voltage to the control circuit of the memory when the memory is identified as the first type of memory.

9. The computer system of claim 8, wherein the identifying logic further comprises a sixth logic that maintains the programming voltage disconnected from the control circuit of the memory when the memory is identified as the second type of memory.

10. The computer system of claim 7, wherein the indentifying logic further comprises a software program running on the CPU.

11. The computer system of claim 7, wherein the control circuit includes a register to store the device identification of the memory if the memory is a first type of memory.

12. The computer system of claim 11, wherein the control circuit accesses the register for the device identification under control of the command written from the CPU into the control circuit when the memory is the first type of memory.

13. The computer system of claim 7, wherein the first type of memory is a flash erasable and electrically programmable nonvolatile memory and the second type of memory is an electrically programmable nonvolatile memory.

14. The computer system of claim 7, wherein the first type of memory is a flash erasable and electrically programmable nonvolatile memory and the second type of memory is a read-only memory.

\* \* \* \* \*

UNITED STATES PATENT AND TRADEMARK OFFICE
CERTIFICATE OF CORRECTION

PATENT NO. : 5,604,880
DATED : February 18, 1997
INVENTOR(S) : Brian L. Dipert It is certified that error appears in the above-identified patent and that said Letters Patent is hereby corrected as shown below:

In column 5 at line 26 delete "Vet" and insert --$V_{CC}$--

Signed and Sealed this

Seventeenth Day of June, 1997

BRUCE LEHMAN

*Attest:*

*Attesting Officer*    Commissioner of Patents and Trademarks